Patented Nov. 24, 1953

2,660,565

UNITED STATES PATENT OFFICE 2,660,565

MANGANESE ACTIVATED CADMIUM LITHIUM SILICATE PHOSPHOR

Alfred Hamilton McKeag, North Wembley, England, assignor to General Electric Company, a corporation of New York No Drawing. Application April 30, 1952, Serial No. 285,321

Claims priority, application Great Britain June 8, 1951

6 Claims. (Cl. 252—301.6)

This invention relates to improvements in luminescent material which are capable of being excited by ultraviolet radiation, cathode rays and the like, and are suitable for use in fluorescent electric discharge lamps or for cathode ray tube screens or for both of these purposes.

According to the invention, an artificial luminescent material consists of crystals containing the elements cadmium, lithium, silicon, oxygen and manganese.

The luminescent materials of the invention may be regarded as lithium cadmium silicates consisting of a combination of the oxides of lithium, cadmium and silicon, activated by manganese. The materials are excited to luminescence by ultraviolet radiation of wavelength 2537 Å. and by cathode rays, and exhibit luminescence of various shades of red, yellow and green, the color shown by the different materials varying according to the composition of the material and the manganese content thereof.

The relative proportions of lithium oxide and cadmium oxide present in these materials may vary over a wide range, but I have found that the best results are obtained when these oxides are present in molecular proportions equal to, or not greatly differing from, the ratio 1:1. The proportion of silica present is preferably such that the ratio $(CdO+Li_2O):SiO_2$ is within the range 1:2 to 3:1. I have found that in general materials in which the molecular proportion of silica is equal to or less than that of the cadmium oxide or lithium oxide, where these are in equal proportions, show a green or yellowish-green luminescence, and that materials in which the molecular proportion of silica is greater than that of the lithium oxide or cadmium oxide, where these are in equal proportions, exhibit a red luminescence. Thus, for example, materials having the compositions $1Li_2O.1CdO.1SiO_2$ and $1\frac{1}{2}Li_2O.1\frac{1}{2}CdO.1SiO_2$ show luminescence of different shades of green, and materials of the compositions $1\frac{1}{2}Li_2O.1\frac{1}{2}CdO.2SiO_2$ and $\frac{1}{2}Li_2O.\frac{1}{2}CdO.1SiO_2$ both give a red luminescence.

The proportion of manganese employed as activator in the luminescent materials of the invention may vary over a wide range, for example from less than 0.01% by weight, up to 5% by weight of the material, but my experiments indicate that it preferably lies within the range of 0.01% to 1% or slightly higher, by weight. Variations in the manganese content appear to have little effect on the colors shown by the green-luminescing materials, but in the case of the red-luminescing range of materials, the depth of the red color increases with increasing manganese content.

The luminescent materials of the invention may be manufactured by heating a mixture of suitable compounds containing cadmium, lithium, silicon, oxygen and manganese in the desired proportions, the preferred starting materials being silica, the carbonates of lithium and cadmium, and manganese carbonate or manganese chloride. The starting materials, in the form of fine powders, are milled together to insure thorough mixing, and the mixture is heated at a temperature of the order of 900–1000° C. for a time which, for developing maximum luminescent efficiency, is usually of the order of an hour or more. In some cases it may be advantageous to carry out the heating in two or more steps, the material being ground between heating steps. It is usually desirable to employ some excess silica in the starting mixture in order to insure that the manganese is completely incorporated into the crystal lattice structure of the product, thus insuring that the body color of the product is substantially white.

It is to be understood that the materials used in the manufacture of the luminescent materials of the invention must be of a high degree of purity, as is usual in the art of manufacturing luminescent materials.

Some specific methods of preparing luminescent materials in accordance with the invention will now be described by way of example.

Example 1

For the preparation of a green-fluorescing material having approximately the composition represented by the formula $1CdO.1Li_2O.1SiO_2$, activated by 1% manganese, a mixture of the following composition is prepared by milling the powdered material together:

17.0 grams lithium carbonate, $Li_2CO_3$
39.5 grams cadmium carbonate, $CdCO_3$
15.2 grams silica, $SiO_2$
1.8 grams manganese chloride, $MnCl_2.4H_2O$.

The cadmium carbonate is prepared by precipitation from solutions of cadmium sulphate and ammonium carbonate. The amount of silica employed is sufficient to give 10% molecular excess silica in the initial mixture, allowance being made for any water present in the silica.

This mixture is heated at 900° C. for one hour, and the material is then ground and reheated for a further period of two hours. The product shows a yellowish-green fluorescence under excitation by ultraviolet radiation of wavelength 2537 Å. or by cathode rays.

*Example 2*

A red-fluorescing material having approximately the composition $3CdO.3Li_2O.4SiO_2$, activated by 1% manganese, is prepared by mixing and heating, in the manner described in Example 1, a mixture of the following composition:

15.5 grams lithium carbonate, $Li_2CO_3$
36.1 grams cadmium carbonate, $CdCO_3$
18.6 grams silica, $SiO_2$
1.8 grams manganese chloride $MnCl_2.4H_2O$.

Materials of the composition $3CdO.3Li_2O.4SiO_2$, containing different proportions of manganese, have been found to show the following variations in the color of luminescence under excitation by ultraviolet radiation of wavelength 2537 Å.

| Percent Mn | Color of fluorescence |
|---|---|
| 0.01 | Moderate orange-pink. |
| 0.1 | Orange-pink. |
| 0.5 | Red. |
| 1.0 | Deeper red. |

*Example 3*

A material fluorescing red under 2537 Å. radiation and having the composition represented by the formula $1CdO.1LiO_2.2SiO_2$, activated by 0.25% manganese, is prepared by milling together in acetone the powders of the following constituents:

31.0 grams cadmium carbonate, $CdCO_2$
13.3 grams lithium carbonate, $Li_2CO_3$
21.6 grams silica, $SiO_2$
0.25 gram manganese carbonate, $MnCO_3$.

The mixture is dried after milling and heated in an open silica tray for one hour at 900° C., after which the material is ground thoroughly and again heated at 900° C. under similar conditions for a further period of one hour.

The variation of fluorescent color with silica ratio is illustrated by the following table which shows the results obtained with a number of luminescent materials in accordance with the invention, prepared in a manner similar to that described in Example 1 above, with the necessary modifications in the proportions of starting materials, the compositions and the colors of fluorescence under 2537 Å. radiation being indicated.

| Composition of material | | | Percent Mn | Color of fluorescence |
|---|---|---|---|---|
| Moles $Li_2O$ | Moles CdO | Moles $SiO_2$ | | |
| 1.5 | 1.5 | 2 | 1 | Red. |
| 0.5 | 0.5 | 1 | 1 | Do. |
| 1.0 | 2.0 | 2 | 1 | Orange-red. |
| 1.5 | 1.5 | 1 | 1 | Dark green. |
| 1.0 | 1.0 | 1 | 1 | Yellow-green. |

It will be appreciated that while the fluorescence of materials in accordance with the invention has been mainly defined and described with reference to excitation by 2537 Å. radiation, which indicates their usefulness in low pressure mercury fluorescent lamps, they may also be useful in other forms of discharge device. Thus, the orange and red fluorescing materials are particularly suitable for use in projection type cathode ray tubes under excitation by cathode rays of 20,000 volts. Here it may be mentioned that the color of fluorescence of materials in accordance with the invention under cathode ray excitation is generally similar to that obtained under excitation by 2537 Å. radiation. In addition, the orange and red fluorescing materials have good temperature stability and are suitable for use in high pressure mercury vapor electric discharge lamps for correcting the color of the light from the discharge.

What I claim as new and desire to secure by Letters Patent of the United States is:

1. A cadmium-lithium silicate luminescent material wherein the CdO and $Li_2O$ are present in approximately equal molecular proportions and the proportion of $SiO_2$ is such that the ratio $$(CdO+Li_2O):SiO_2$$

is in the range of about 1:2 to 3:1, and manganese activator in a proportion between about 0.01% and 5% by weight of the material.

2. A cadmium-lithium silicate luminescent material having approximately the composition represented by the formula $1CdO.1Li_2O.1SiO_2$, activated by about 1% by weight of manganese.

3. A cadmium-lithium silicate luminescent material having approximately the composition represented by the formula $3CdO.3Li_2O.4SiO_2$, activated by about 1% by weight of manganese.

4. A cadmium-lithium silicate luminescent material having approximately the composition represented by the formula $1CdO.1Li_2O.2SiO_2$, activated by about 0.25% by weight of manganese.

5. The method of preparing a cadmium-lithium silicate luminescent material which comprises mixing compounds of cadmium, lithium, silicon and manganese in proportions to yield, upon heating, CdO and $Li_2O$ in approximately equal molecular proportions with $SiO_2$ in a proportion such that the ratio $(CdO+Li_2O):SiO_2$ is in the range of about 1:2 to 3:1 and manganese activator in a proportion between about 0.01% and 5% by weight of the material, and heating the mixture at a temperature of about 900° C. to 1000° C. for a time sufficient to develop substantially maximum luminescence.

6. The method of preparing a cadmium-lithium silicate luminescent material which comprises mixing silica, the carbonates of lithium and cadmium, and a manganese compound of the group consisting of the carbonate and the chloride in proportions to yield, upon heating, CdO and $Li_2O$ in approximately equal molecular proportions with $SiO_2$ in a proportion such that the ratio $(CdO+Li_2O):SiO_2$ is in the range of about 1:2 to 3:1 and manganese activator in a proportion between about 0.01% and 5% by weight of the material, and heating the mixture at a temperature of about 900° C. to 1000° C. for a time sufficient to develop substantially maximum luminescence.

ALFRED HAMILTON McKEAG.

References Cited in the file of this patent

UNITED STATES PATENTS

| Number | Name | Date |
|---|---|---|
| 2,169,046 | Headrick | Aug. 8, 1939 |
| 2,205,815 | Foulke | June 25, 1940 |
| 2,615,850 | McKeag | Oct. 28, 1952 |